United States Patent [19]

Murakami

[11] 3,961,694
[45] June 8, 1976

[54] ROLLER DEVICE

[76] Inventor: Masahiro Murakami, 28-21 Oimazato 2-chome, Higashinari, Osaka, Japan

[22] Filed: Jan. 31, 1975

[21] Appl. No.: 545,908

Related U.S. Application Data

[63] Continuation of Ser. No. 321,309, Jan. 5, 1973, Pat. No. 3,878,927.

[30] Foreign Application Priority Data

Feb. 22, 1972 Japan............................ 47-18812

[52] U.S. Cl. ................................................ 193/37
[51] Int. Cl.² ........................................ B65G 39/04
[58] Field of Search .................... 193/35 MD, 37; 198/127 R; 432/246

[56] References Cited
UNITED STATES PATENTS

| 1,539,833 | 6/1925 | Fahrenwald | 432/246 |
| 1,737,117 | 11/1929 | Morton | 198/127 X |
| 1,789,847 | 1/1931 | Smith | 198/127 R X |
| 1,791,166 | 2/1931 | Kathner | 198/127 R X |
| 2,169,623 | 8/1939 | Weiss et al. | 193/37 X |
| 2,650,603 | 9/1953 | Howes | 193/37 X |
| 3,363,735 | 1/1968 | Hotchkiss | 193/37 |
| 3,710,917 | 1/1973 | Black et al. | 198/127 R X |
| 3,878,927 | 4/1975 | Murakami | 193/37 |

FOREIGN PATENTS OR APPLICATIONS

| 305,900 | 2/1929 | United Kingdom | 198/127 |

Primary Examiner—Evon C. Blunk
Assistant Examiner—James L. Rowland
Attorney, Agent, or Firm—Armstrong, Nikaido & Wegner

[57] ABSTRACT

This invention relates to improvements in a roller device by which articles placed on a roller face are moved in a desired direction in a plane, and composed of a main body, a plurality of rollers mounted around the periphery thereof with a cylindrical boss included in the main body and adapted to receive a shaft for mounting a plurality of the devices.

1 Claim, 8 Drawing Figures

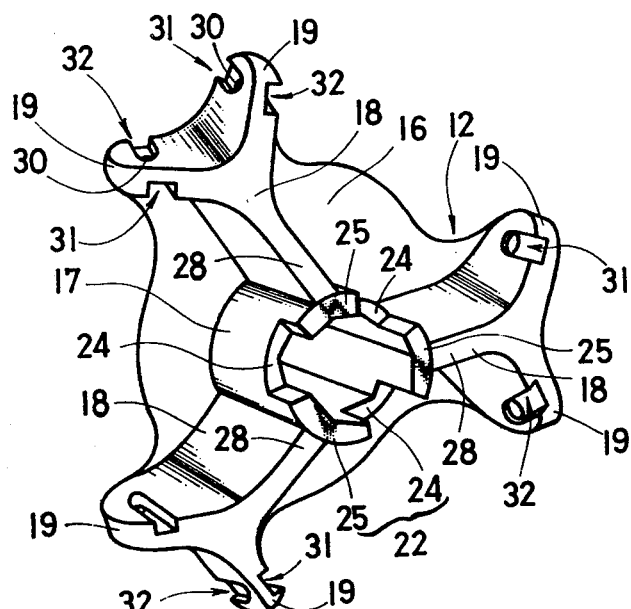
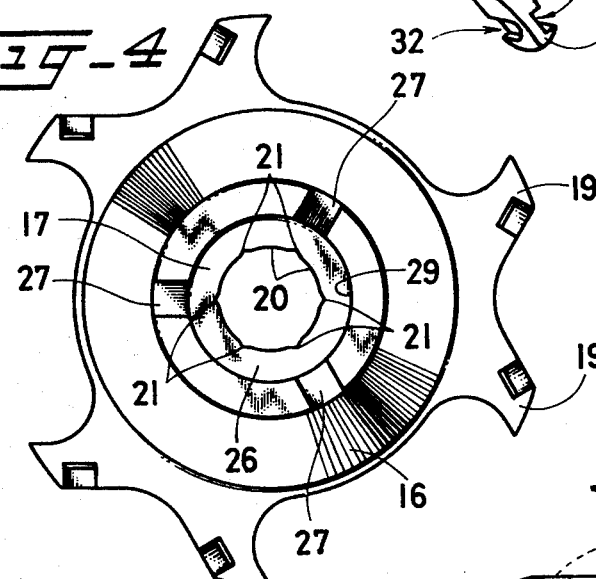
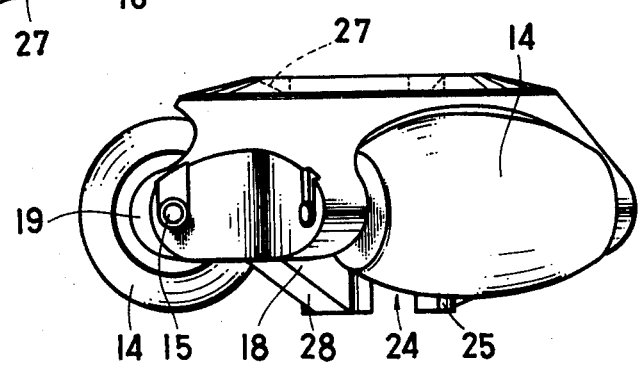

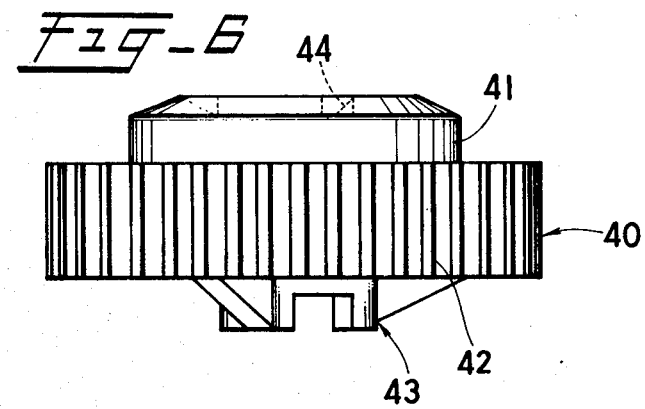
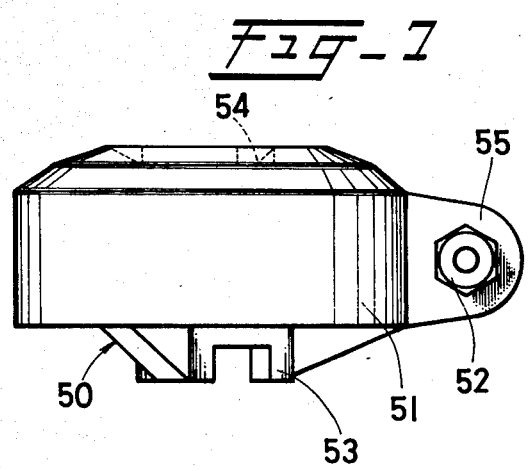
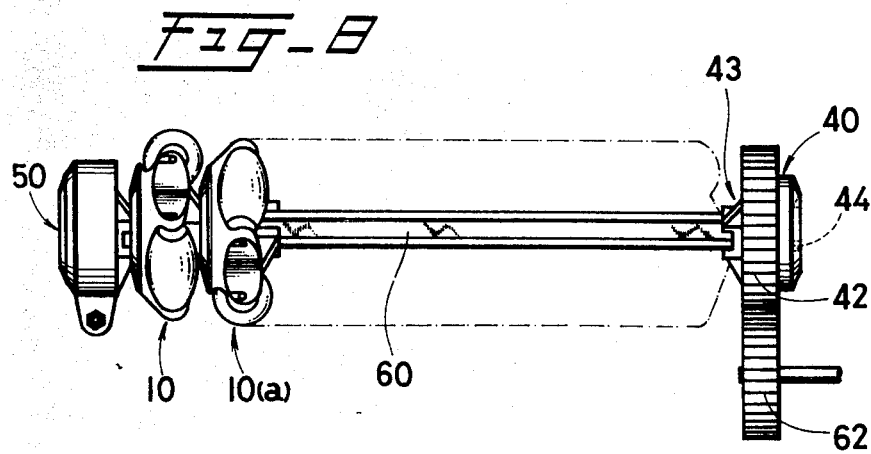

ROLLER DEVICE

This is a continuation of application Ser. No. 321,309, filed Jan. 5, 1973 now U.S. Pat. No. 3,878,927.

BACKGROUND OF THE INVENTION

A conveyor apparatus has heretofore been proposed in U.S. Pat. No. 3,363,735 in which a conveying face is formed by an assembly of roller devices each comprising a boss supported on a frame and a plurality of rollers equidistantly spaced apart along a circle arranged concentrically with the boss and rotatable in a direction at right angles with the direction of rotation of the boss. With such conveyor apparatus, a conveying face of the desired width will not always be obtained simply by varying the number of the roller devices constituting the assembly, since the respective roller devices are of a uniform size.

The primary object of the present invention is to provide a roller device such that a plurality of such roller devices can be fitted together with the rollers of one device positioned between the rollers of another device respectively so that the greatest possible number of rollers will be positioned to define a conveying face as a whole to assure a uniform conveying operation at all times.

Another object of the present invention is to provide a roller device such that when a plurality of the roller devices are assembled, one roller device can be fitted to another in face-to-face or back-to-face relation.

Still another object of this invention is to provide a roller device which can be fitted onto a round or angular shaft so as to be free to rotate on the shaft or to be driven by the shaft.

Yet another object of the present invention is to provide a roller device which overcomes the problems and deficiencies associated with past conveying and transporting devices related to the transportation of articles from one location to another.

A still further object of the present invention is to provide a roller device which is simple and inexpensive of construction and operation and which is capable of being joined with other similar devices in a variety of arrangements to form a conveying face which will permit a uniform and steady transporting operation.

Another object of the present invention is to provide a roller device which is adaptable for use in a variety of conveying and transporting environments and which is capable of combination with other such devices to produce an assembly having utility in transporting and conveying articles of various sizes and weights.

Yet another object of the present invention is to provide a device of the class indicated which is capable of the functions referred to and which is based upon sound mechanical and engineering principles and which is not complex in structure and is adaptable to combination with similar devices from either the front or the back to produce a variety of assembly arrangements varying greatly in roller density.

Other objects will appear hereinafter.

SUMMARY OF THE INVENTION

Generally, in accordance with the present invention, a roller device is provided which is composed of a main body including a cylindrical boss adapted for mounting on a shaft and a plurality of rollers rotatably mounted along the outer periphery of the main body. A plurality of ribs extend radially from the outer periphery of the boss, with each rib branching into arm elements at the end opposite the boss. A plate connects the ribs and arm elements. Grooves in the arm elements form a bore for receiving the shaft of a roller. The inner faces and outer faces of each end of the boss are so structured as to be adapted for engagement with opposing structure and features in similar devices.

An embodiment of this invention is shown in the drawings wherein:

FIG. 1 is a front view of a roller device;
FIG. 2 is a sectional view along the line II-II in FIG. 1;
FIG. 3 is a perspective view of a main body;
FIG. 4 is a rear view of the main body;
FIG. 5 is a plan view of FIG. 1;
FIG. 6 is a plan view of a drive wheel;
FIG. 7 is a plan view of a clamp ring; and
FIG. 8 is a side elevation showing the device in operation.

DETAILED DESCRIPTION OF THE DRAWINGS

Figure 1:
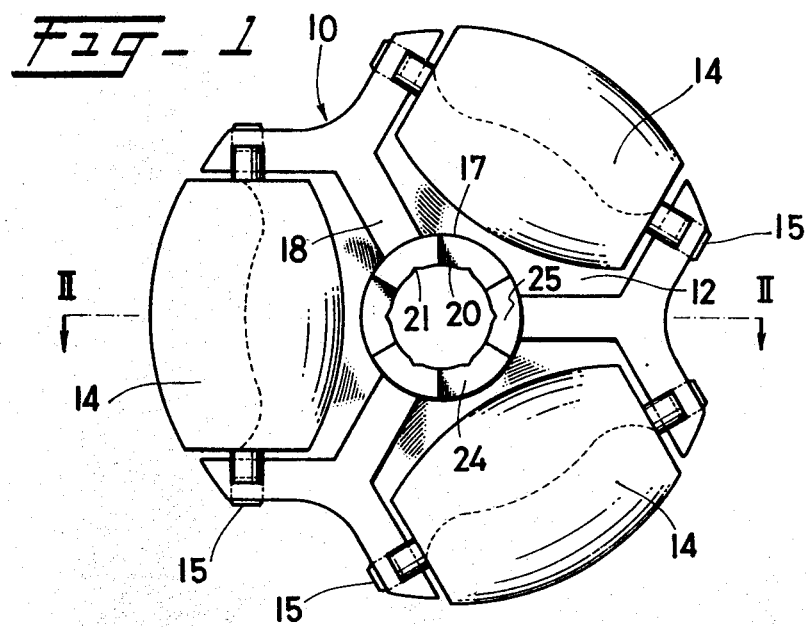

A roller device 10 comprises a main body 12 integrally molded of a synthetic resin material or casted with metal and a plurality of rollers 14 rotatably mounted along the outer periphery of the main body 12. The main body 12 includes a cylindrical boss 17 to be mounted on a shaft and a plurality of ribs 18 radially extending from the outer periphery of the boss and spaced apart equidistantly. A space for a roller is formed between adjacent ribs.

Each of the ribs 18 branches at its distal end into support arms 19 and 19 in a Y-shaped form. At the opposite sides of the roller space, the support arms of the adjacent ribs are positioned in parallel with each other. To reinforce the support arms 19 and ribs 18, the boss 17 is provided at its one end with a connecting plate 16 which extends between the support arms 19 and 19 and is integral with the ribs 18 and cylindrical boss 17.

The distal end of the support arm 19 is formed, in its side facing the roller space, with a vertical groove 31 extending downward from the upper edge thereof up to a mid portion of the height of the support arm 19 and having a depth approximately one half the thickness of the support arm 19. In the outer side of the distal end of the support arm 19, there is formed a similar vertical groove 32 extending upward from the lower edge thereof. Both vertical grooves 31 and 32 overlap each other at the center of distal end of the support arm 19, the overlapping portion providing a circular bore 30 for a roller shaft.

A barrel-like roller 14 having a greater diameter at its midportion than at the ends, is fitted in each roller space of the main body 12. A roller shaft 15 extending from the end face of the roller is rotatably fitted into the bore 30 at the distal end of each support arm.

The cylindrical boss 17 is formed in its inner face with circular arc faces 20 and polygonal angular faces 21 positioned alternately, the circular arc faces 20 being adapted to fit with a shaft of a circular cross section with the angular faces 21 defining a polygon which overlaps a circle defined by the circular arc faces, with its corners opposing the ribs 18 and rollers 14 respectively. Accordingly, the main body 12 can be mounted on a round shaft for free rotation or can be fitted on a shaft of a polygonal cross section to rotate integrally with the shaft.

Figure 2:
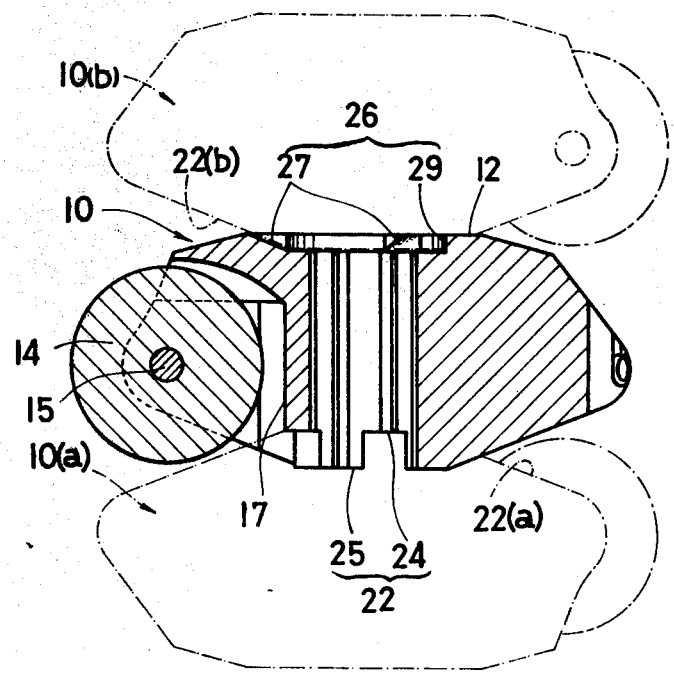

One end face 22 of the boss 17 is formed with tonguelike projections 25 opposing the ribs 18 and recesses 24 opposing the rollers 14 and having the same width as the projection 25. Thus two roller devices 10 and 10a are fitted together, with the end faces 22 and 22 of the bosses 17 at the same side positioned in face-to-face relation as illustrated in FIG. 2. The recesses 24 of one device are engaged with the projections of the other device in alternating manner. As a result, one of the roller devices 10 enters the other by the depth of the recesses 24 and the ribs of main body 12 of one roller device position in the roller spaces of main body of the other roller device. Consequently, one device is displaced from the angular other by one half the pitch of the roller arrangement, and these tightly engaged two roller devices can be treated as a unit. In this combination the rollers of respective devices 10 and 10a approaches closest.

At the other end face 26 of the cylindrical boss 17 there is formed a circular recess 29 in conformity with the outer diameter of the cylindrical boss 17 and having one half the depth of the recess 24 in the end face 22. In opposing relation to the rollers 14, the peripheral wall of the circular recess 29 is formed with cutouts 27. Accordingly, when two roller devices 10 and 10(b) are fitted together with the different end faces 22(b) and 26 facing each other, the rib front faces 28 of the roller device 10(b) engage in the cutouts 27 in the end face 26 and, the ends of the projections 25 of the device 10(b) contact the bottom face of the circular recess 29 with the result that the device 10(b) enters the device 10 by the depth of the circular recess 29, namely by one half the depth of the recess 24, the one device being displaced from the other by one half the pitch of the roller arrangement.

In practicing this invention, the boss end face can of course be formed with engaging portions of some other different shape engageable with an adjacent similar device, in place of the projections recesses and cutouts. The depth of the engagement can be varied depending upon whether the main bodies are fitted together in face-to-face relation or back-to-back relation, thus assuring the same advantages as in the foregoing.

When a conveyor face is formed of a suitable number of assemblies of the roller devices 10 each comprising a shaft of a circular cross section and the roller devices 10 fitted on the shaft with suitable retainers attached to the opposite ends of the shaft, the roller devices 10 are free to rotate on the round shaft and articles delivered onto the conveyor face will be supported on the rollers 14 located at an upper position and sent toward a desired direction by the rotation of the rollers 14 and the rotation of the main bodies 12 or by the combination of these two modes of rotation.

When the roller devices 10 are mounted on a shaft with the same faces of all the devices oriented in one direction, the end face 22 of one boss 17 will engage the end face 26 of another boss 17, resulting each device displaced from the adjacent device by one half the pitch of the roller arrangement without any adjustment, and all devices rotate simultaneously. Conversely, if the faces of two roller devices 10 are directed in different directions, the unit engagement will be mounted on a shaft intermittently to reduce the number of roller devices on a shaft.

Further in the case where the roller devices 10 are fitted on a shaft 60 of a polygonal section, the angular faces 21 of the boss 17 will fit to the angular shaft 60, permitting all the devices to rotate together with the shaft. In this arrangement a drive wheel 40 as shown in FIG. 6 is mounted on one end of the angular shaft 60 and associated with drive means 62, the drive wheel including a gear 42 or sprocket formed along its outer periphery and provided in its opposite faces with engaging portions 43 and 44 adapted for engagement to different depths. A suitable retainer is mounted on the other end of the shaft 60. In this way, the drive wheel 40 is forced to rotate in engagement with the roller devices to transport articles on the conveyor face.

When the articles are pushed toward the direction of the shaft 60, the articles can be readily taken off the conveyor face due to the rotation of the rollers 14. Further mounted on the opposite ends of a round shaft carrying roller devices 10 are clamp rings 50 as shown in FIG. 7 and formed in its opposite end faces with engaging portions 53 and 54 adapted for engagement to different depths, the clamp ring having a split portion in its peripheral portion. After the engaging portion 53 of the ring 50 is engaged with the engaging portion of the roller device, a bolt 52 is passed through projections 55 extending from the opposite sides of the split and the clamp ring is fastened, whereby the roller device can be locked to the round shaft against idle rotation.

From the foregoing, it may be seen that the present invention provides a useful device for combination with similar devices in a variety of arrangements to produce and assembly with a face for conveying or transporting articles with ease and rapidity. The device avoids the deficiencies and problems of the past and yet is simple and inexpensive of construction.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A roller device comprising a main body, including a cylindrical boss adapted for mounting on a shaft, a plurality of rollers rotatably spaced apart concentrically around said boss, ribs extending radially from the outer periphery of the boss to rotatably receive said rollers, said ribs branching into a plurality of support arms with front and rear faces at the end opposite the boss, wherein one end face of the boss is formed with tonguelike projections and recesses alternately adjacent to said rollers and ribs, and the other end face of the boss is formed with a circular recess having the same diameter as the diameter of said boss and a depth different from height of the said projections, and cutouts extending from said circular recess being angularly displaced from the ribs on the one face by one half the angular pitch of the roller arrangement wherein two said roller devices may be coupled together by placing the projections of one of said roller devices into the circular recess or the recesses of the other of said roller devices whereby the rollers of said one device are displaced by one half of the angular pitch of the roller placement of said other devices.

* * * * *